United States Patent
Watanabe

(10) Patent No.: US 11,523,026 B2
(45) Date of Patent: Dec. 6, 2022

(54) INFORMATION PROCESSING SYSTEM, INFORMATION PROCESSING METHOD, AND NON-TRANSITORY RECORDING MEDIUM FOR MANAGING AND NOTIFYING UPPER LIMIT OF FILE SIZE PROCESSABLE BY WORKFLOW TO USER

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/455,291

(22) Filed: Nov. 17, 2021

(65) Prior Publication Data
US 2022/0174177 A1 Jun. 2, 2022

(30) Foreign Application Priority Data
Nov. 30, 2020 (JP) .............................. JP2020-198156

(51) Int. Cl.
*H04N 1/00* (2006.01)
*H04N 1/32* (2006.01)

(52) U.S. Cl.
CPC ....... *H04N 1/32454* (2013.01); *H04N 1/0097* (2013.01); *H04N 1/00212* (2013.01); *H04N 1/00482* (2013.01); *H04N 1/00949* (2013.01)

(58) Field of Classification Search
None
See application file for complete search history.

(56) References Cited

U.S. PATENT DOCUMENTS

| | | | | |
|---|---|---|---|---|
| 2008/0025642 | A1* | 1/2008 | Kim | G06T 3/40 715/705 |
| 2011/0051193 | A1* | 3/2011 | Okabe | H04N 1/2179 358/1.16 |
| 2013/0176594 | A1* | 7/2013 | Tanaka | H04N 1/00244 358/1.15 |
| 2015/0029530 | A1* | 1/2015 | Asai | H04N 1/00413 358/1.15 |
| 2017/0019477 | A1* | 1/2017 | Yamada | H04L 67/1001 |
| 2017/0237871 | A1* | 8/2017 | Fan | H04N 1/00482 358/1.13 |
| 2018/0074769 | A1* | 3/2018 | Hirose | G06F 3/1296 |
| 2019/0098154 | A1* | 3/2019 | Baba | H04N 1/0044 |
| 2020/0204693 | A1* | 6/2020 | Zhang | G06F 3/1205 |

FOREIGN PATENT DOCUMENTS

JP 2020-106993 7/2020

OTHER PUBLICATIONS

Extended European Search Report for 21208156.6 dated Apr. 25, 2022.

* cited by examiner

*Primary Examiner* — Henok Shiferaw
(74) *Attorney, Agent, or Firm* — IPUSA, PLLC

(57) ABSTRACT

An information processing system includes circuitry to generate a workflow as a current workflow, analyze the current workflow to obtain a file maximum value indicating a maximum value of a file size processable by the current workflow, and cause a display to display the file maximum value obtained.

7 Claims, 18 Drawing Sheets

FIG. 5

| APP | SIZE |
|---|---|
| OCR APP | 100MB |
| OCR AND STAMP APP | 100MB |
| DIVISION AND IMAGE EXTRACTION AND OCR APP | 50MB |

FIG. 6

| COMPONENT NAME | SIZE |
|---|---|
| EXTERNAL SERVICE | |
| UPLOAD | 150MB |
| DOWNLOAD | 300MB |
| ACQUIRE LIST | – |
| OCR | |
| EXECUTE OCR | 100MB |
| MAIL | |
| TRANSMIT MAIL | 100MB |
| PDF OPERATION | |
| DIVIDE PAGE | 100MB |
| EXTRACT IMAGE | 100MB |
| MERGE PDF | 100MB |
| STAMP | |
| TIMESTAMP | – |
| IMAGE STAMP | – |

FIG. 9

```
{
  title: "appName"
  type: "scan",
  languages: ["en"],
  uiParts: [
    {
      label: "fileName",
      type: "text"
    }
  ],
  flow: {
    url: "flow/xxxx/job",
    dataLimit: "100MB"
  }
}
```

FIG. 11

```
{
  totalResults: 3,
  results: [
    {
      id: 1,
      createdAt: "20200101T13:00:00Z",
      status: {
        type:"error",
        detail: "fileLimitError"
      },
      fileSize: 200000000,
      totalPage: 100,
      jobSettings: {
        scanColor: "color",
        scanResolution: "600",
        originalSide: "oneSided",
        originalSize: "auto"
      }
    },
    ...
  ]
}
```

INFORMATION PROCESSING SYSTEM, INFORMATION PROCESSING METHOD, AND NON-TRANSITORY RECORDING MEDIUM FOR MANAGING AND NOTIFYING UPPER LIMIT OF FILE SIZE PROCESSABLE BY WORKFLOW TO USER

CROSS-REFERENCE TO RELATED APPLICATION

This patent application is based on and claims priority pursuant to 35 U.S.C. § 119(a) to Japanese Patent Application No. 2020-198156, filed on Nov. 30, 2020, in the Japan Patent Office, the entire disclosure of which is hereby incorporated by reference.

BACKGROUND

Technical Field

Embodiments of the present disclosure relate to an information processing system, an information processing method, and a non-transitory recording medium.

Related Art

There are known techniques in which a workflow including information on a series of work procedures in which a plurality of functions is combined, or arranged, is generated by using each function provided by a multi-function peripheral (MFP), a cloud service, or the like, and a series of works is performed in a predetermined order by executing the workflow.

In order to smoothly execute the workflow, such a technique manages an upper limit value of usage amount for each of a plurality of functions corresponding to steps of processing included in a workflow, calculates a usage amount for executing the processing, and reserves each function when a determination indicates that the processing is executable.

SUMMARY

An exemplary embodiment of the present disclosure includes an information processing system including circuitry to generate a workflow as a current workflow, analyze the current workflow to obtain a file maximum value indicating a maximum value of a file size processable by the current workflow, and cause a display to display the file maximum value obtained.

An exemplary embodiment of the present disclosure includes an information processing method. The method includes generating a workflow, analyzing the workflow to obtain a file maximum value indicating a maximum value of a file size processable by the workflow, and causing a display to display the maximum value.

An exemplary embodiment of the present disclosure includes a non-transitory recording medium storing a plurality of instructions which, when executed by one or more processors, causes the processors to perform a method. The method includes generating a workflow, analyzing the workflow to obtain a file maximum value indicating a maximum value of a file size processable by the workflow, and causing a display to display the maximum value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of a table having items of application and upper limit, according to the exemplary embodiment;

FIG. 6 is a diagram illustrating an example of a table having items of component to be arranged in workflow generation and file size, according to the exemplary embodiment;

FIG. 9 is a diagram illustrating an example of screen information acquired from a content provision service, according to the exemplary embodiment;

FIG. 11 is a diagram illustrating an example of information on job history acquired from a metadata generation service, according to the exemplary embodiment;

Figure 1:
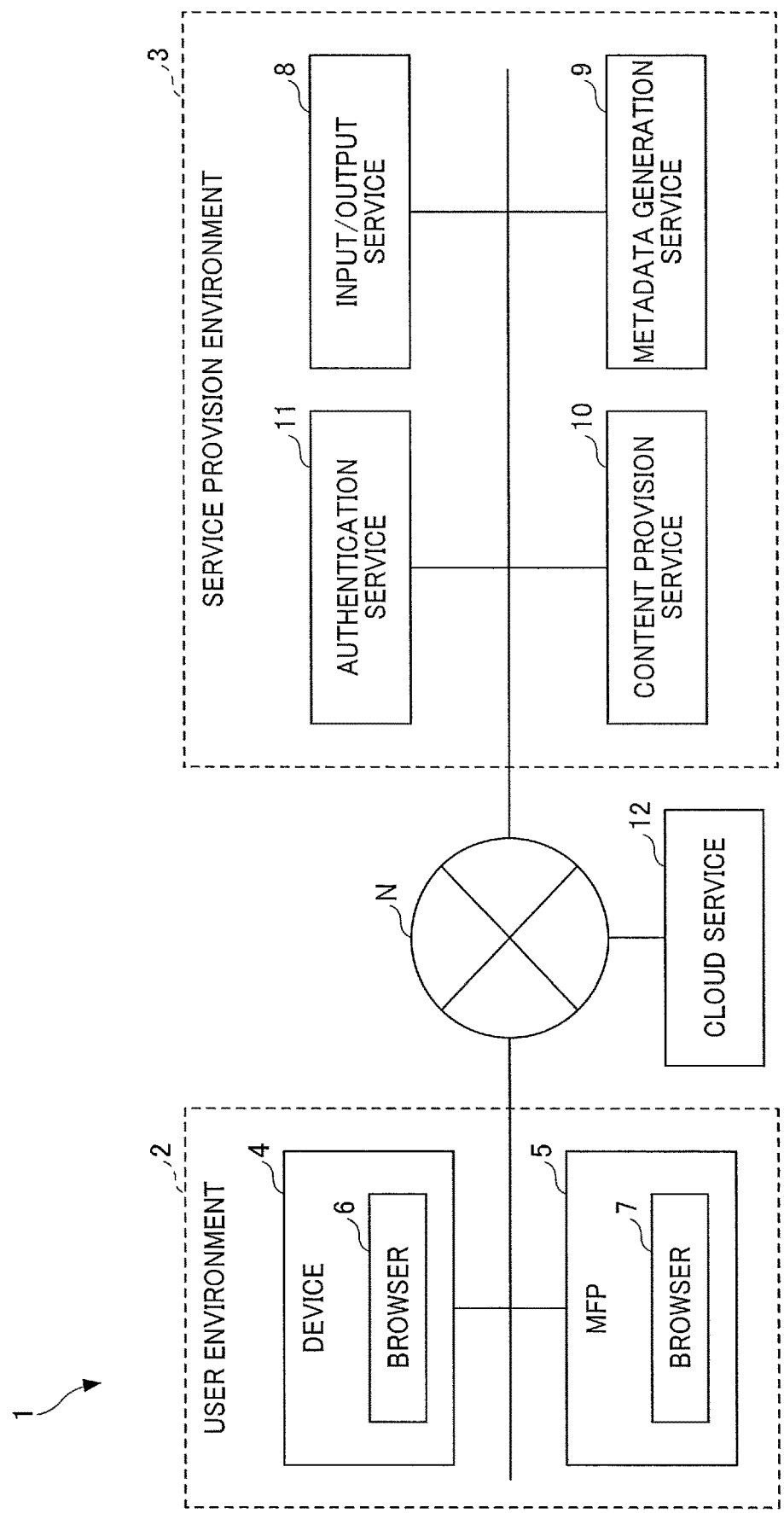
FIG. 1 is a schematic diagram illustrating an example of a configuration of an information processing system according to an exemplary embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described below with reference to the attached drawings. In order to facilitate understanding of the description, the same components are denoted by the same reference numerals in the respective drawings as much as possible, and redundant description is omitted.

Configuration of Information Processing System:

FIG. 1 is a schematic diagram illustrating an example of a configuration of an information processing system 1 according to an exemplary embodiment. In the information processing system 1, a user environment 2 and a service provision environment 3 are communicably connected through a network N.

An information processing system 1 according to the present embodiment illustrated in FIG. 1 provides a technique of generating a workflow including information on a series of work procedures in which a plurality of functions are combined, or arranged, by using each function provided by, for example, a Multi-Function Peripheral (MFP) 5 or a cloud storage service (cloud service) 12, and executing the workflow to perform a series of works in a predetermined order. In the following description, terms such as "flow," "application," and "app" are also used as terms synonymous with "workflow." Each of the "application" and the "app" may include a "workflow" or a "flow." For example, the "application" may include the "workflow" itself and a "screen for making settings to be passed to the workflow."

First, a technical background of the information processing system 1 according to the present embodiment is described. There are known services that cooperate an input/output device such as the MFP 5, which inputs and outputs documents, with a cloud storage service 12 that provides storage areas of storage through the network N. Such a service is, hereinafter, referred to as a "device cooperation service." An example of the device cooperation service is a scan-to-storage service in which an application (workflow) in the MFP 5 distributes image data representing images scanned by the MFP 5 in the user environment 2 to the cloud storage service 12 set in advance.

In addition, in the device cooperation service, development of the device cooperation service is facilitated by using a cooperation application (hereinafter, referred to as an "input/output service") for the MFP 5 and the cloud storage service 12 that have a function of absorbing a difference between a plurality of unique functions (for example, a function of adding bibliographic information) of the cloud storage service 12, an Optical Character Reader/Recognition (OCR) processing function, a file conversion function, and the like. However, such a conventional input/output service has a problem in that an upper limit of a file size (file capacity) to be input varies depending on functions to be combined.

For example, in a case where a flow (workflow) in which a file scanned by using the MFP 5 is subjected to OCR and then distributed to the cloud storage service 12 is generated, a file size processable by the OCR component and a file size processable by a cloud storage distribution component may be different from each other. In addition, the file size may also differ depending on a type of cloud storage.

In addition, although a user who generates a flow recognizes a file upper limit processable by the flow, another user who actually operates the flow has no way to check the upper limit The flow is created, or generated, by combining, or arranging, a plurality of components. Some of the components are set with a processable file size (file capacity) as described above. Accordingly, the file upper limit processable by each flow is a value of a component having the smallest processable file upper limit among the plurality of components arranged in the flow.

An object of the information processing system 1 according to the present embodiment is to manage an upper limit of file size (file capacity) processable by a workflow and notify a user of the upper limit.

Referring again to FIG. 1, the user environment 2 includes browsers 6 and 7 installed on various apparatuses such as a device 4 and the MFP 5. The browsers 6 and 7 are connected to the service provision environment 3 through the network N. The MFP 5 transmits a scanned image to the service provision environment 3 or acquires a file to be printed from the service provision environment 3, for example. From each of the browsers 6 and 7, captured pictures or local files may be transmitted to the service provision environment 3. In addition, the browsers 6 and 7 may set various settings in relation to services or generate flows.

The service provision environment 3 includes an input/output service 8, a metadata generation service 9, a content provision service 10, and an authentication service 11. Each of the input/output service 8, the metadata generation service 9, the content provision service 10, and the authentication service 11 may be implemented by a server device connected to the network N. Alternatively, a single server device may include two or more of the functions corresponding to the input/output service 8, the metadata generation service 9, the content provision service 10, and the authentication service 11.

The input/output service 8 is a service that includes a function of absorbing differences in unique functions (for example adding bibliographic information) in a plurality of cloud storage services, a function of OCR processing, and a function of file conversion, in the device cooperation service. The input/output service 8 provides a service that is implemented by linking the MFP 5 in the user environment 2 with an application in the input/output service 8.

The metadata generation service 9 is a service of defining metadata for generating data serving as a request to the input/output service 8, and is defined by a developer of an application (for example, generating workflows and executing software). Information indicating which process flow of the input/output service the application launches is also defined.

The content provision service 10 is a service for providing a web page to be provided to a user.

The authentication service 11 provides services such as an authentication function for cooperating with an external service and management of user information.

The information processing system 1 may further use an external cloud service such as the cloud storage service 12 through the network N.

Figure 2:
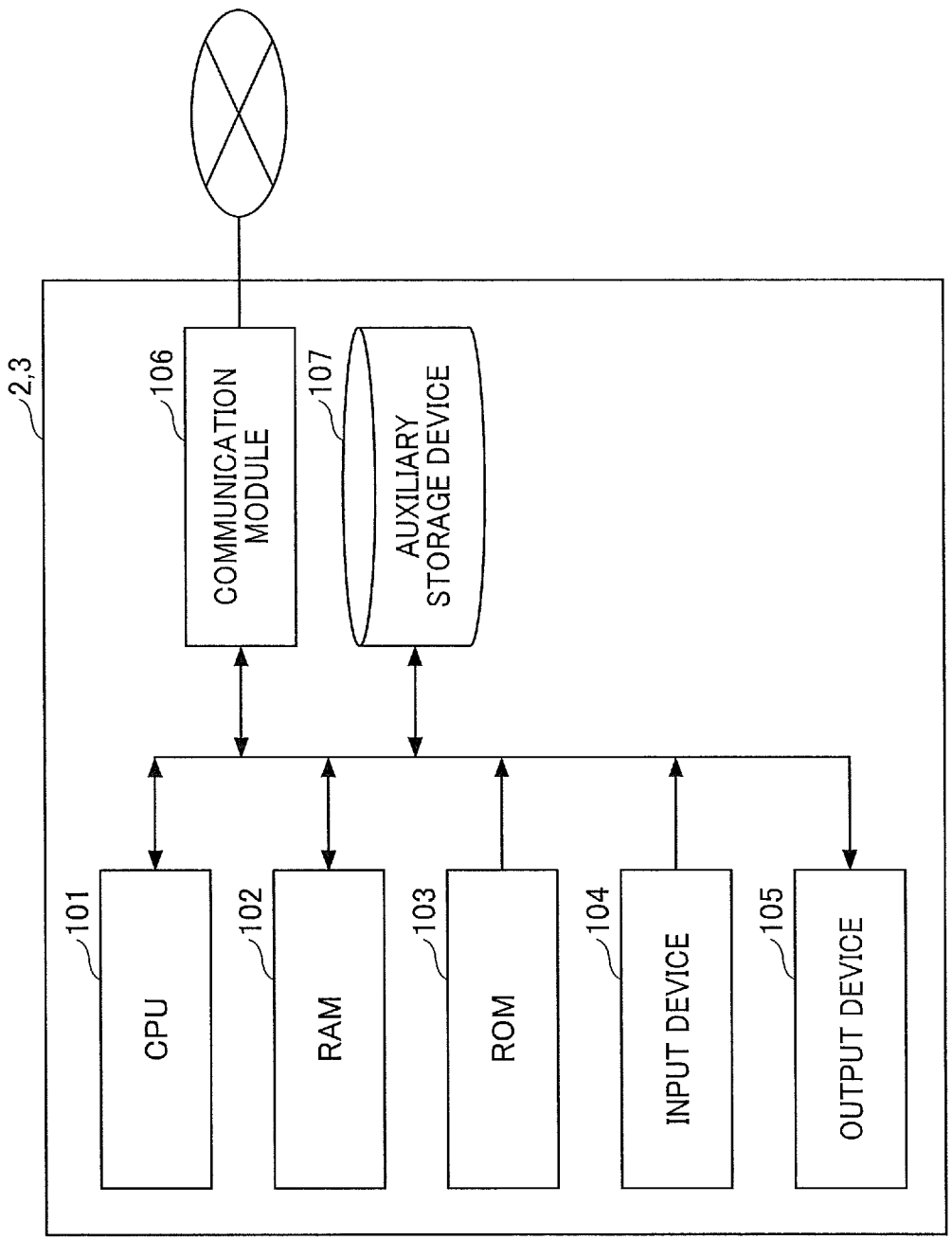
FIG. 2 is a block diagram illustrating an example of a hardware configuration of each device in a user environment and a service provision environment according to the exemplary embodiment.

FIG. 2 is a block diagram illustrating an example of a hardware configuration of each device in the user environment 2 and the service provision environment 3 according to the present embodiment. As illustrated in FIG. 2, each of the device 4 and the MFP 5 in the user environment 2, or each of the input/output service 8, the metadata generation service 9, the content provision service 10, and the authentication service 11 in the service provision environment 3 physically includes, as a computer system, a Central Processing Unit (CPU) 101, a Random Access Memory (RAM) 102 and a Read Only Memory (ROM) 103, which are main storage devices, an input device 104 such as a keyboard or a mouse, an output device 105 such as a display, a communication module 106, which is a data transmission/reception device such as a network card, and an auxiliary storage device 107.

Each function of each device is described below with reference to FIG. 3. Each function of each device in the user environment 2 and the service provision environment 3 is implemented by hardware such as the CPU 101 loading and executing a predetermined communication module 106, the input device 104, and the output device 105 under control of the CPU 101 and reading or writing from or to the RAM 102 or the auxiliary storage device 107.

Figure 3:
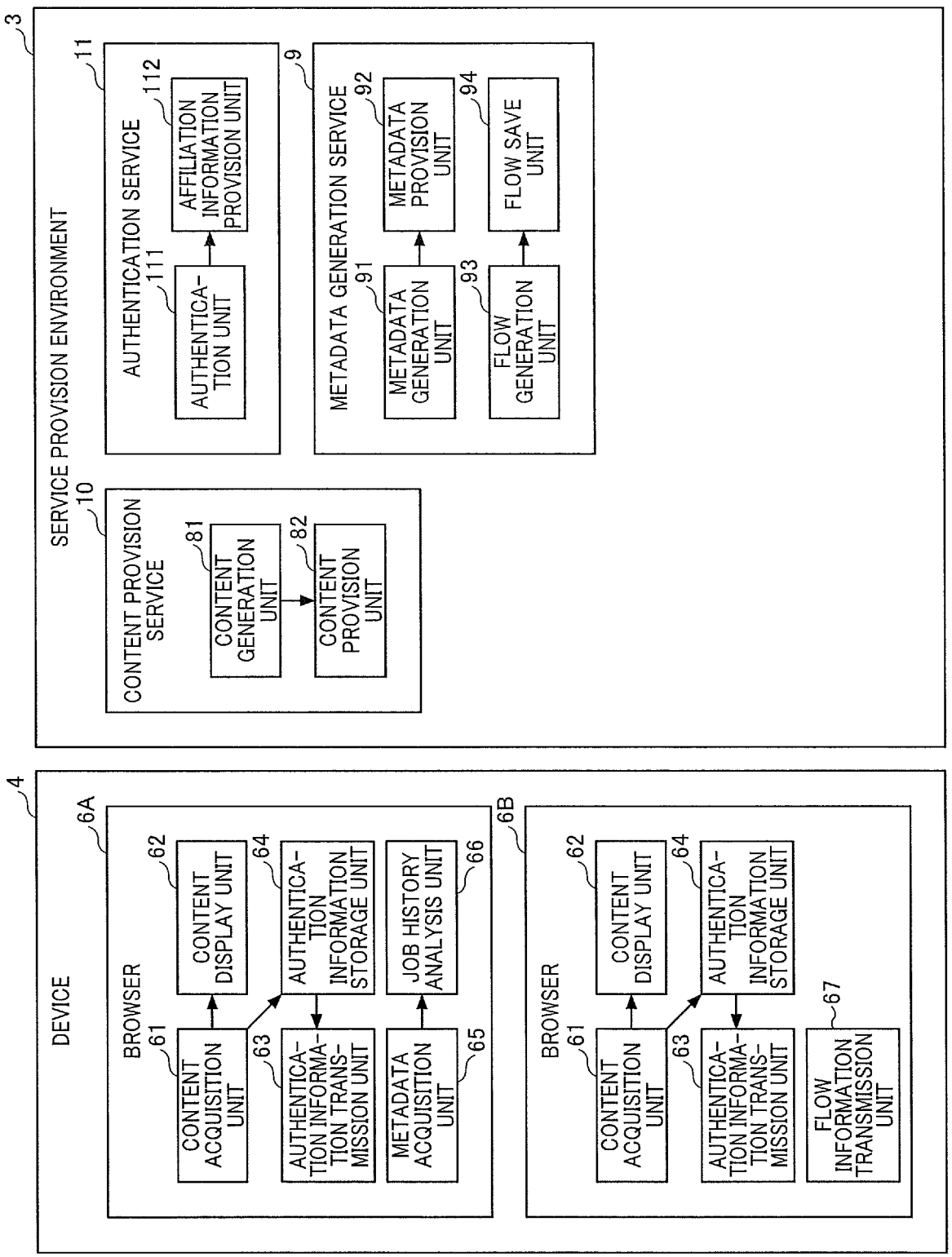
FIG. 3 is a block diagram illustrating an example of a functional configuration of a device and the service provision environment according to the exemplary embodiment.

FIG. 3 is a block diagram illustrating an example of a functional configuration of the device 4 and the service provision environment 3 according to the present embodiment. In the example of FIG. 3, the device 4 has two browsers 6A and 6B.

The browser 6A is a browser for executing a flow. The browser 6A includes a content acquisition unit 61, a content display unit 62, an authentication information transmission unit 63, an authentication information storage unit 64, a metadata acquisition unit 65, and a job history analysis unit 66.

The content acquisition unit 61 acquires content (hypertext makeup language (html), JavaScript, cascading style sheets (CSS), or the like) from the content provision service 10.

The content display unit 62 displays the content acquired by the content acquisition unit 61.

The authentication information transmission unit 63 communicates with the authentication service 11 to log in to the content acquired by the content acquisition unit 61.

The authentication information storage unit 64 stores in a storage area, a result of performing authentication on the authentication service 11 and affiliation information acquired based on the result.

The metadata acquisition unit 65 communicates with the metadata generation service 9 to acquire metadata such as the job history and setting values (settings) of an application.

The job history analysis unit 66 analyzes the job history in the metadata acquired by the metadata acquisition unit 65.

The content display unit 62 also serves as a "display unit" that displays a size upper limit (capacity upper limit) calculated by a maximum value calculation unit (corresponding to a flow save unit 94, which is described later, of the metadata generation service 9) on a screen of a user terminal (device 4) used by a user. In addition, the job history analysis unit 66 also serves as an analysis unit that causes the display unit to display reference information for avoiding occurrence of an error related to a file size by referring to setting content (settings) of the current workflow and execution history when execution of the workflow is requested (in response to a workflow execution request). Hereinafter, the error related to a file size may be referred to as a file size error, in the description of the embodiments. The job history analysis unit 66 also serves as a "monitoring unit" that warns the user when the size upper limit is likely to be exceeded during execution of the workflow. That is, the job history analysis unit 66 notifies the user of a warning on a file size error immediately before the size upper limit exceeds during execution of the workflow.

The other browser 6B of the device 4 is a browser for generating, or creating, a workflow. The browser 6B includes the content acquisition unit 61, the content display unit 62, the authentication information transmission unit 63, the authentication information storage unit 64, and a flow information transmission unit 67. The content acquisition unit 61, the content display unit 62, the authentication information transmission unit 63, and the authentication information storage unit 64 of the browser 6B are the same as those of the browser 6A.

The flow information transmission unit 67 transmits information for flow generating a flow generated on a workflow generation screen 41 (see FIG. 8) acquired from the content provision service 10 to the metadata generation service 9.

The content provision service 10 of the service provision environment 3 includes a content generation unit 81 and a content provision unit 82. Metadata for content may be acquired from the metadata generation service 9, and the content may be generated based on the metadata.

The metadata generation service 9 includes a metadata generation unit 91, a metadata provision unit 92, a flow generation unit 93, and a flow save unit 94.

The metadata generation unit 91 generates metadata or job execution history used in relation to the content or input/output. The metadata provision unit 92 provides the metadata generated by the metadata generation unit 91 to the browser 6A. The flow generation unit 93 generates, or creates, a workflow based on flow generation information set on the browser 6B. The flow save unit 94 saves, or stores, the workflow generated by the flow generation unit 93.

The flow save unit 94 also serves as a "maximum limit value calculation unit" that analyzes the workflow generated, or created, by the flow generation unit 93 and calculates an upper limit value (maximum limit value) indicating the upper limit of a file size processable by the workflow.

The authentication service 11 includes an authentication unit 111 and an affiliation information provision unit 112.

The authentication unit 111 performs authentication such as a log-in. The affiliation information provision unit 112 provides the browser 6A and the browser 6B with information on an affiliation of the user authenticated by the authentication unit 111.

Figure 4A:
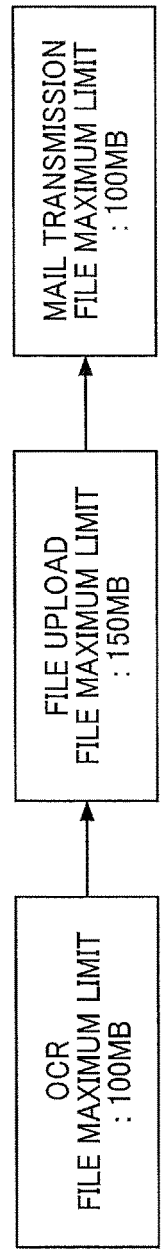
FIG. 4A to FIG. 4C are diagrams each illustrating an example of an input upper limit (input maximum limit value) of a workflow, according to the exemplary embodiment.
Figure 4B:
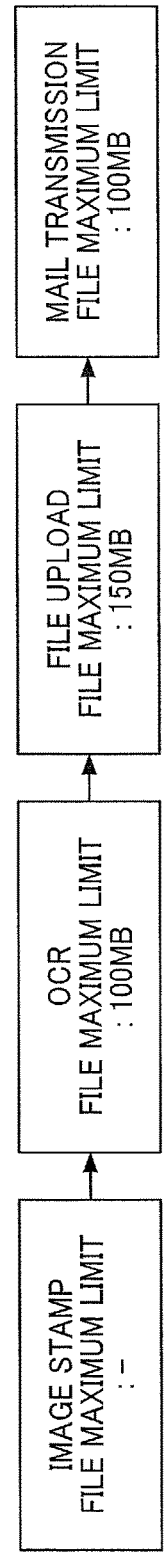
Figure 4C:
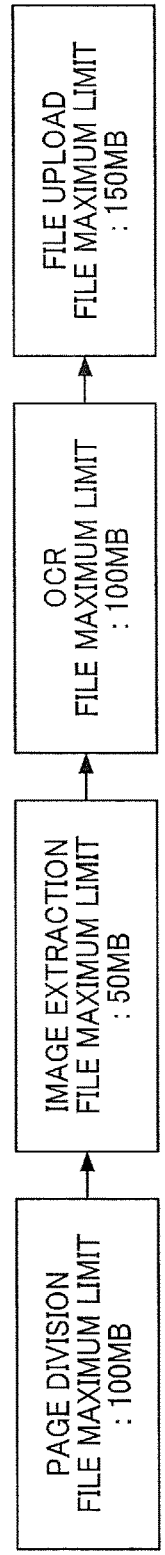

Maximum Limit Setting Process:

FIG. 4A to FIG. 4C are diagrams each illustrating an example of an input upper limit (input maximum limit value) of a workflow according to the present embodiment. FIG. 4A, FIG. 4B, and FIG. 4C are corresponding to examples of workflows, F1, F2, and F3, respectively.

Each workflow is generated by combining a plurality of components. To each of the plurality of components, a maximum limit (maximum value) of file size to receive, or accept, a file may be set. The maximum limit (maximum value) of file size may be, hereinafter, referred to as a "file maximum limit (file maximum value)." An acceptable input value of file of each flow is the smallest maximum value among the maximum values corresponding to the plurality of components included in the corresponding flow.

For example, the workflow F1 of FIG. 4A includes three components of OCR, file upload, and mail transmission, and the file maximum value of each of the component of OCR and the component of mail transmission is 100 MB that is the minimum value among the file maximum values of the three components included in the workflow F1. Accordingly, the file maximum value of the workflow F1 of FIG. 4A is 100 MB.

Similarly, in the workflow F2 of FIG. 4B, the file maximum value of each of the components of OCR and mail transmission is the 100 MB, which is the minimum value among the file maximum values of the components included in the workflow F2. Accordingly, the file maximum value of the workflow F2 of FIG. 4B is 100 MB. In the workflow F3 of FIG. 4C, the file maximum value of a component of image extraction is 50 MB, which is the minimum value among the file maximum values of the components included in the workflow F3. Accordingly, the file maximum value of the workflow F3 of FIG. 4C is 50 MB.

According to the present embodiment, a file size error occurring in executing a workflow is avoided by calculating such a file upper limit for each workflow and presenting the file upper limit to the user in advance. For example, in each of the workflows F1, F2, and F3 respectively illustrated in FIG. 4A, FIG. 4B, and FIG. 4C, there is processing of scanning a subject to generate scan data is included in the preceding stage of the workflow.

In the present exemplary embodiment, even in a case where there is a high probability of occurrence of a file size error, such an error is not immediately detected to stop the workflow, but a notification for prompting the user to check such an error is presented. This is because a file size error may be and may not be depending on a size of input data of the workflow.

For example, in the workflow F2 illustrated in FIG. 4B, since a component of image stamp is arranged at the head, even if a size at a time of scanning is equal to or less than 100 MB, the size may increase by adding an image to the scanned document. That is, even when the size of input data is less than the file maximum limit of the workflow, a file size error may occur.

In the workflow F2 illustrated in FIG. 4C, since a component of page division is arranged at the head, even if a size at a time of scanning exceeds 50 MB, the size may be reduced to be under the flow input upper limit by performing the page division with respect to the scan data and dividing the scan data. That is, even when the size of input data exceeds the file maximum limit of the workflow, a file size error may not occur.

FIG. 5 is a diagram illustrating an example of a table having items of application (workflow) and size upper limit (size maximum limit) according to the present embodiment. A flow to be used for each created application is determined. The applications in FIG. 5 are created with settings using the flows in FIG. 4A, FIG. 4B, and FIG. 4C, in order of the arrangement from the top. Accordingly, the file maximum limit value processable by each application is the same value as the upper limit of each of the workflows illustrated in FIG. 4A to FIG. 4C.

FIG. 6 is a diagram illustrating an example of a table having a list of components to be arranged in workflow generation and a file size corresponding to each component, according to the present embodiment. The components in the list is an example and a part of all components. In the left column of FIG. 6, each component and a function to be provided is described. For example, an external service component provides functions of "UPLOAD," "DOWNLOAD," and "ACQUIRE LIST." The "UPLOAD" function is performable with up to 150 MB, and the "DOWNLOAD" function is performable with up to 300 MB. On the other hand, since the "ACQUIRE LIST" function is not a function to use files, there is no size designation.

A component such as a stamp component does not designate a size for itself. Such a component (for example, the stamp component) adds information to an input file. This may increase a file size depending on a component. Page division of a Portable Document Format (PDF) operation component divides an input file, thereby reducing the size.

In the present embodiment, a maximum limit value setting process is performed based on the configuration of the file upper limit of each workflow as illustrated in FIG. 4 (FIG. 4A to FIG. 4C) to FIG. 6.

Figure 7:
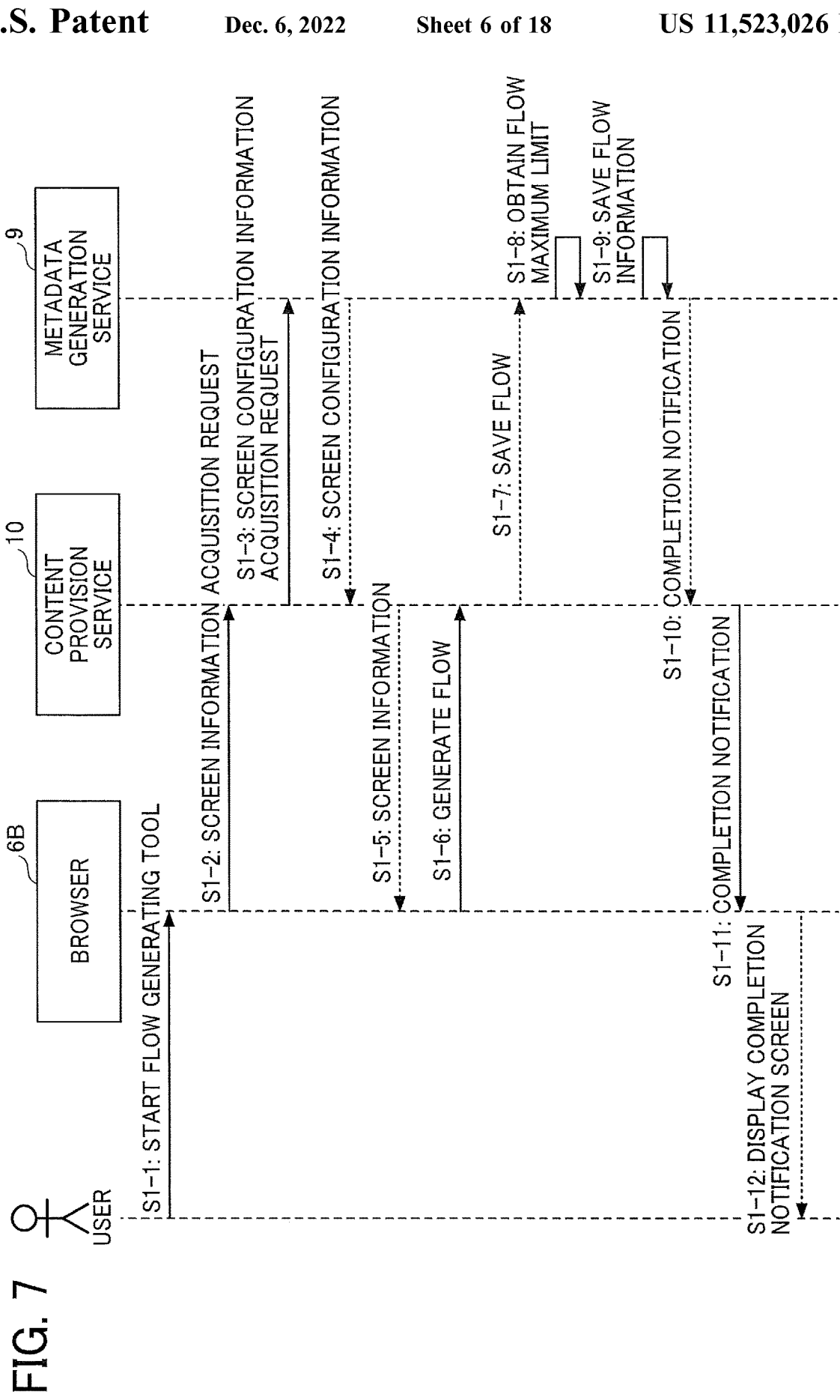
FIG. 7 is a sequence diagram illustrating an example of a workflow generating process, according to then exemplary embodiment.
Figure 8:
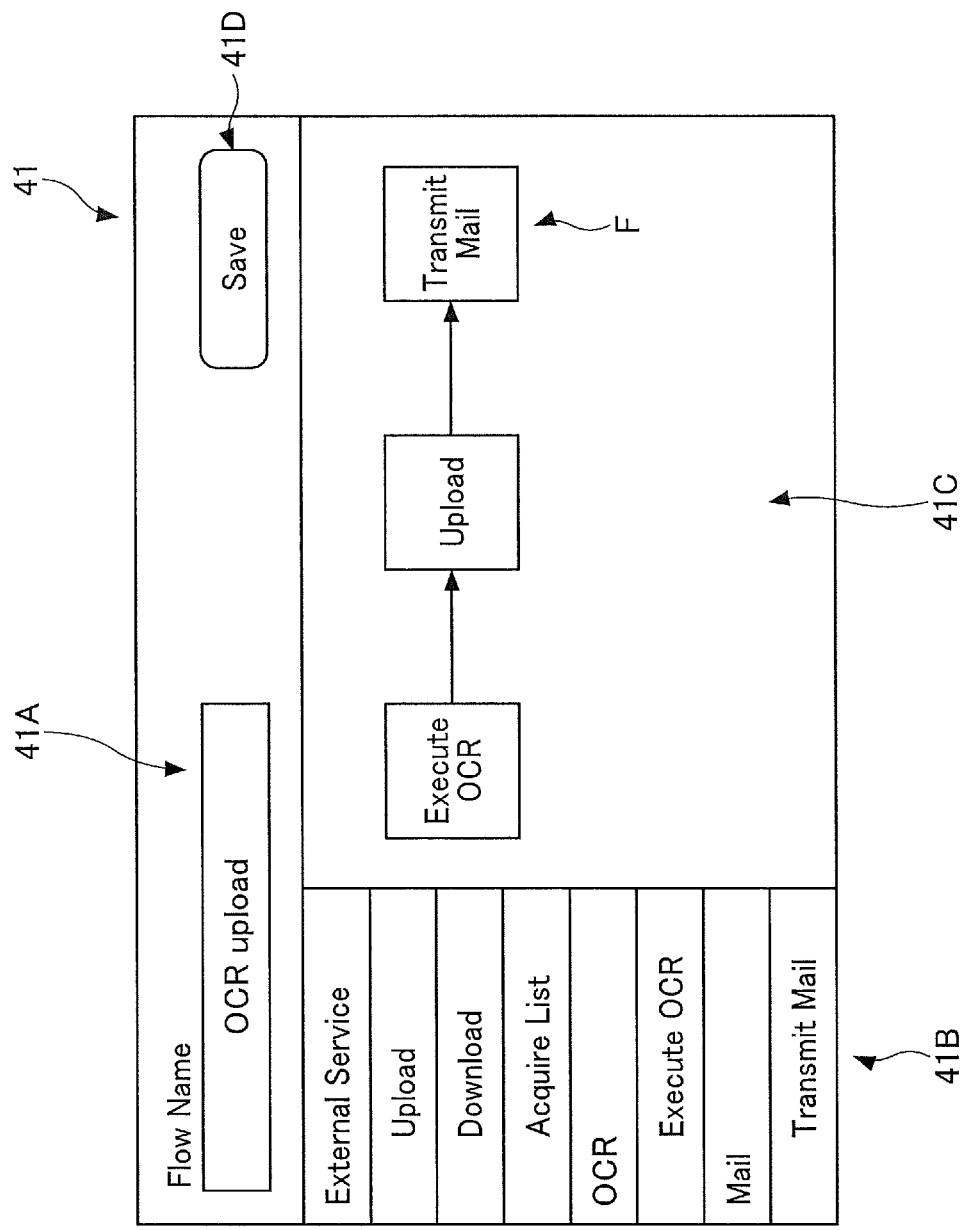
FIG. 8 is a diagram illustrating an example of a workflow generation screen, according to the exemplary embodiment.

Workflow Generating Process:

A process of generating (creating) a workflow F is described with reference to FIG. 7 to FIG. 9. FIG. 7 is a sequence diagram illustrating an example of a process of generating a workflow (workflow generating process) according to the present embodiment.

A user activates the flow generating tool on the browser 6B (step S1-1), and requests for the workflow generation screen 41 (see FIG. 8) via the browser 6B. The browser 6B issues a screen information acquisition request to the content provision service 10 (step S1-2). The content provision service 10 transmits a screen configuration information acquisition request to the metadata generation service 9 (step S1-3). The content provision service 10 acquires screen configuration information including information such as an available component list from the metadata generation service 9 (step S1-4). The content provision service 10 transmits screen information to the browser 6B as a response of the screen information acquisition request (step S1-5).

The browser 6B receives the screen information and draws the workflow generation screen 41 based on the received image information. FIG. 8 is a diagram illustrating an example of the workflow generation screen 41 according to the present embodiment. In the example of screen illustrated in FIG. 8, a component list 41B is displayed on the left of the screen, and a workflow generation area 41C is displayed on the right of the screen. In the workflow generation area 41C, components to be used are displayed in blocks, and the workflow F is generated by connecting the blocks with arrows. In the upper part of the screen, there is a flow name input field 41A and a save button 41D for saving a generated workflow, for example, the workflow F, with a flow name Returning to FIG. 7, the user generates, or creates, the workflow F via the workflow generation screen 41 displayed on the browser 6B (step S1-6). When the generation of the workflow F is completed, the user presses the save button 41D. When the save button 41D is pressed, the content provision service 10 issues a flow save request to the metadata generation service 9 (step S1-7).

In response to the flow save request, the metadata generation service 9 refers to the file maximum values corresponding to the arranged components and obtains the minimum value from among the file maximum values in the flow (step S1-8). Information on the obtained file maximum value of the workflow F is stored as a parameter that is a part of application information (step S1-9). The processing of steps S1-8 and S1-9 is performed by, for example, the flow save unit 94 of the metadata generation service 9.

When the storage of the workflow F in the metadata generation service 9 is completed, a completion screen is displayed on the browser 6B via the content provision service 10 (steps S1-10 and S1-11, and S1-12).

Figure 10:
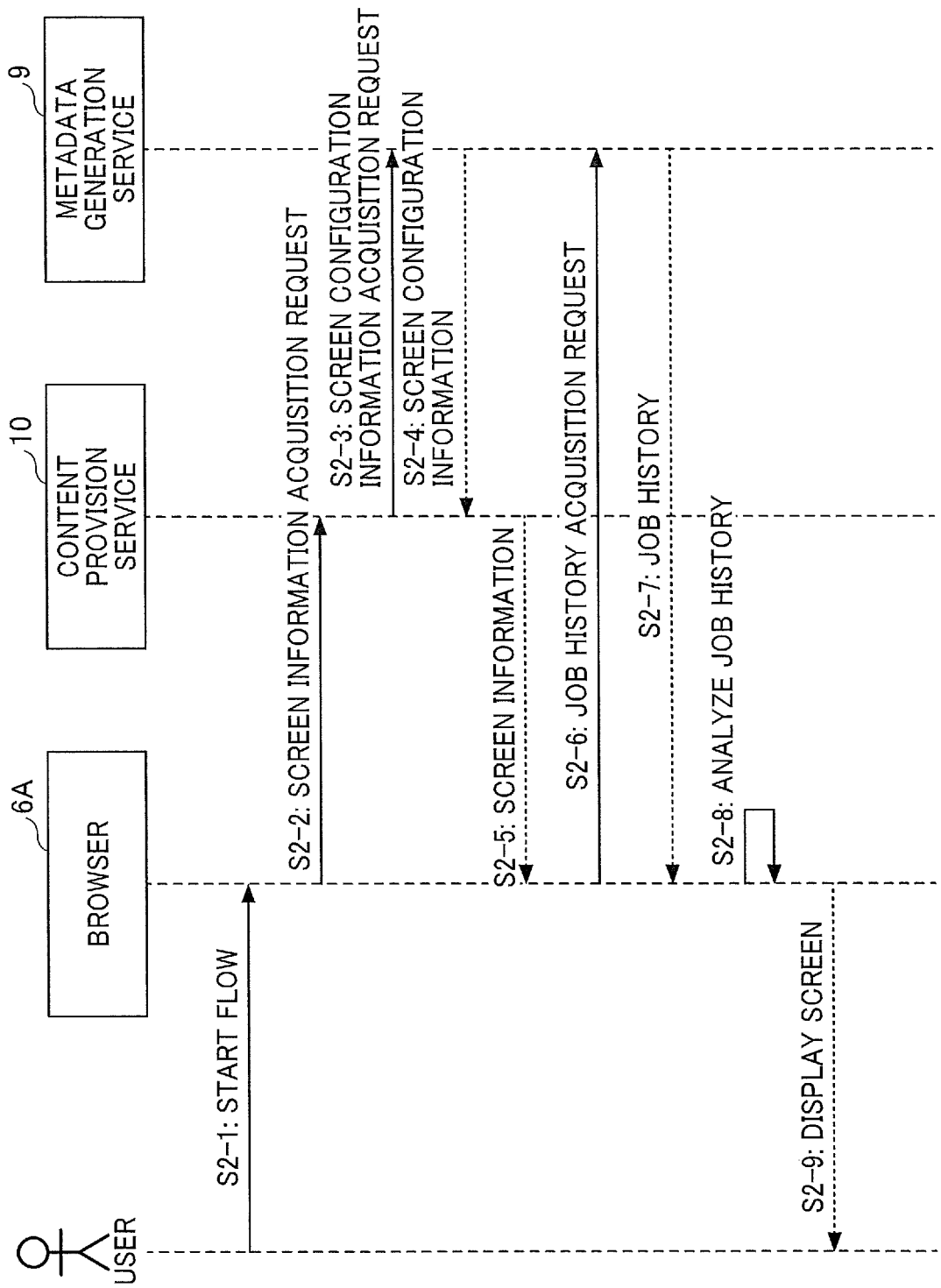
FIG. 10 is a sequence diagram illustrating an example of a workflow start process, according to the exemplary embodiment.

Workflow Start Process:

A process of starting the workflow F is described with reference to FIG. 10 to FIG. 14. FIG. 10 is a sequence diagram illustrating an example of a process of starting a workflow (workflow start process) according to the present embodiment.

The user inputs a Uniform Resource Locator (URL) to the browser 6A in order to make a transition to a web page used for starting the workflow F (step S2-1). The browser 6A acquires a designated resource and displays a corresponding screen (steps S2-2 and S2-5). At this time, the content provision service 10 acquires information used for generating the screen from the metadata generation service 9 as appropriate (steps S2-3 and S2-4).

FIG. 9 is a diagram illustrating an example of screen information acquired by the browser 6A from the content provision service 10 in step S2-5 of the sequence illustrated in FIG. 10, according to the present embodiment. In the screen information illustrated in FIG. 9, information on a name and a type of an application and a parameter indicating a language are set. The screen information further includes "uiParts" as which information on a user interface (UI) to be displayed on the screen is set, and "flow" as which information on a flow to be executed by the application is set. The "flow" includes parameters such as "url" for execution and "dataLimit" that indicates an input upper limit (input maximum limit value).

Further, the browser 6A acquires the job execution history (job history) from the metadata generation service 9 (steps S2-6 and S2-7). When the acquisition is completed, the job history is analyzed (step S2-8), and then the screen is displayed (step S2-9).

Figure 12:
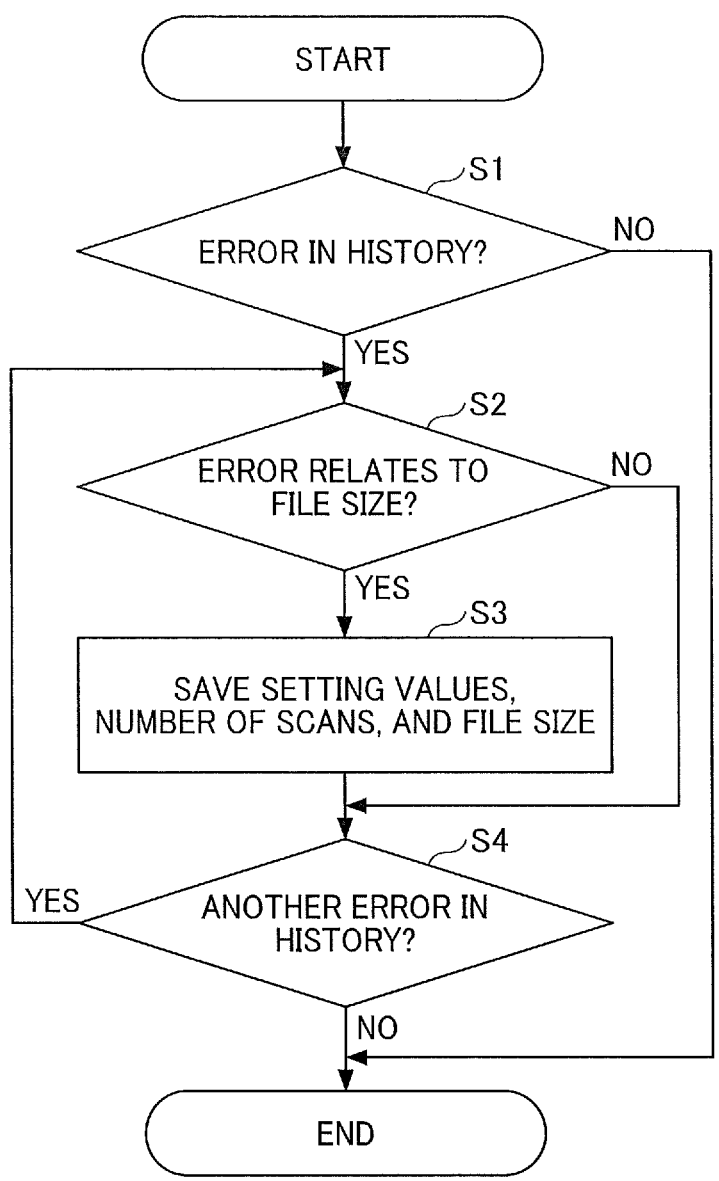
FIG. 12 is a flowchart illustrating an example of a job history analysis process, according to the exemplary embodiment.

FIG. 11 is a diagram illustrating an example of information on job history (job history information) acquired by the browser 6A from the metadata generation service 9 in step S2-7 of the sequence illustrated in FIG. 10, according to the present embodiment. As an example of job, a case of scanning is indicated in the job history information illustrated in FIG. 11. In the job history information illustrated in FIG. 11, a job history list is set in "results." The job history includes information such as "id." The job history further includes information on an execution time, an execution result, a status indicating details of the execution result, a file size at a time of execution, the number of scanned sheets, and settings in scanning FIG. 12 is a flowchart illustrating an example of a process of analyzing the acquired job history (job history analysis process), according to the present embodiment. The process of the flowchart of FIG. 12 is executed in step S2-8 of the sequence illustrated in FIG. 10. The process of the flowchart of FIG. 12 is executed by, for example, the job history analysis unit 66 of the browser 6A.

The job history analysis process illustrated in FIG. 12 is performed in order to extract a pattern (error pattern) of one or more prior errors related to a file size from the job execution history and save, or store, the extracted error pattern. The stored error pattern is used to notify the user before execution of the same flow because there is a high probability of occurrence of an error when scanning is executed with the same or similar settings (setting content).

In step S1, whether the acquired job history includes an error (prior error) is determined. Specifically, the job history information illustrated in FIG. 11 is referred, and when the "type" of the "status" indicates an error, a determination result indicating that there is an error in the job history is obtained. When the determination result indicates that there is an error (Yes in step S1), the process proceeds to step S2. When the determination result indicates that there is no error (No in step S1), the process ends.

In step S2, whether the error in the job history determined in relation to the processing of S1 is related to a file size or not is determined. Specifically, the job history information illustrated in FIG. 11 is referred, and when information on the "type" of the "status" indicating an error is extracted, and the "detail" indicates the error related to a file size, a determination result indicating that the error in the job history is an error related to a file size is obtained. The error related to a file size may be referred to as a file size error, hereinafter in the description of the embodiments. The "file size error" is defined as an error detected when a size of data used in the workflow F exceeds the file maximum value (file maximum limit) of the workflow F. When the determination result indicates the file size error (Yes in step S2), the process proceeds to step S3. On the other hands, the determination result indicates the error is not related to a file size (No in step S2), the process proceeds to step S4.

In step S3, information on a setting value, the number of scans (the number of sheets to be scanned), and a file size corresponding to the file size error, which is determined in relation to the processing of S2 and is in relation to the job history, is saved, or stored, in a storage area of the browser 6B. The "setting value" stored at this time is related to the size (for example, scan color setting or resolution). The setting values of scan color setting and resolution have an effect on a scan capacity (size for scan).

In step S4, whether there is another error in the job history or not is determined. If there is another error (Yes in step S4), the process returns to step S2, and when there is not another error (No in step S4), the process ends.

The browser 6A refers to the information, which is stored in the job history analysis process of FIG. 12 and is in relation to the job history on a scan setting screen 44 (see FIG. 16 and FIG. 17) described later or when scanning is performed (see FIG. 18), and notifies the user that the job is likely to cause an error.

Returning to FIG. 10, the browser 6A displays an execution history screen 42 or an application screen 43.

Figure 13:
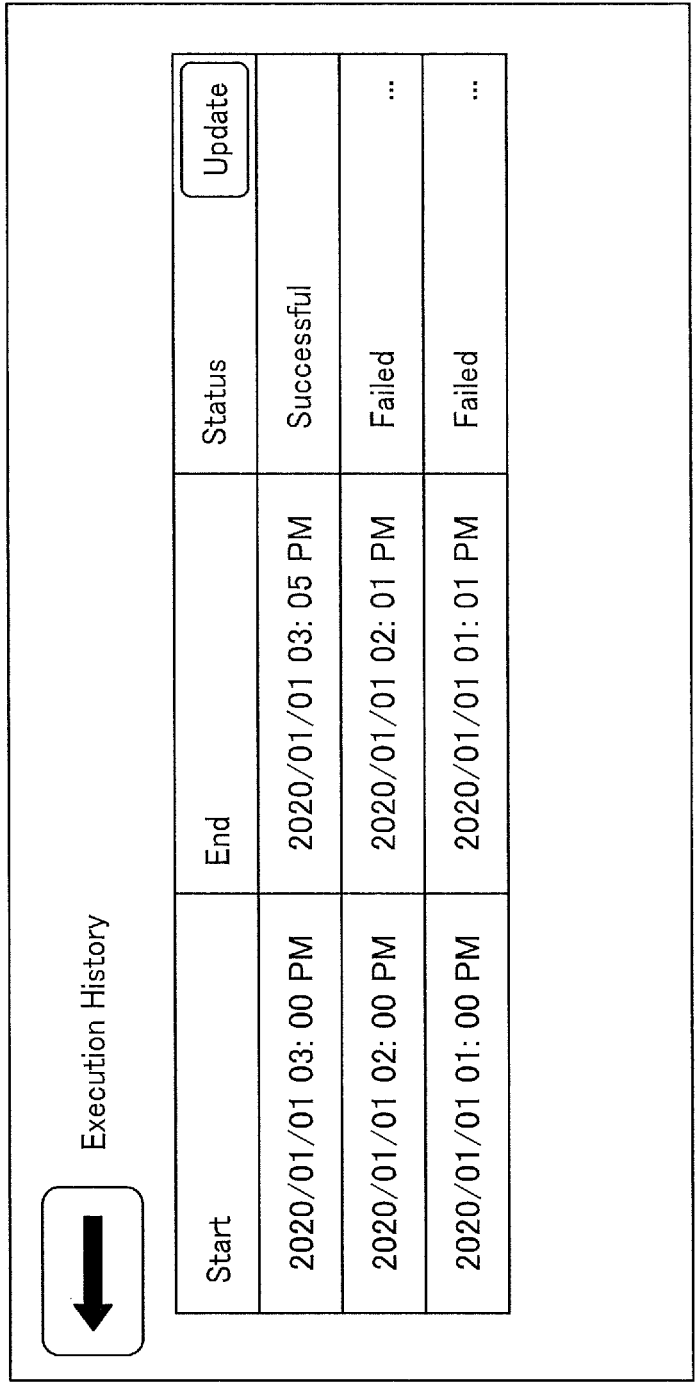
FIG. 13 is a diagram illustrating an example of an execution history screen, according to the exemplary embodiment.

FIG. 13 is a diagram illustrating an example of the execution history screen 42, according to the present embodiment. A list corresponding to the execution history is displayed based on the history information illustrated in FIG. 11. This allows the user to view and check error details by selecting each job that caused the error, on the execution history screen 42.

Figure 14:
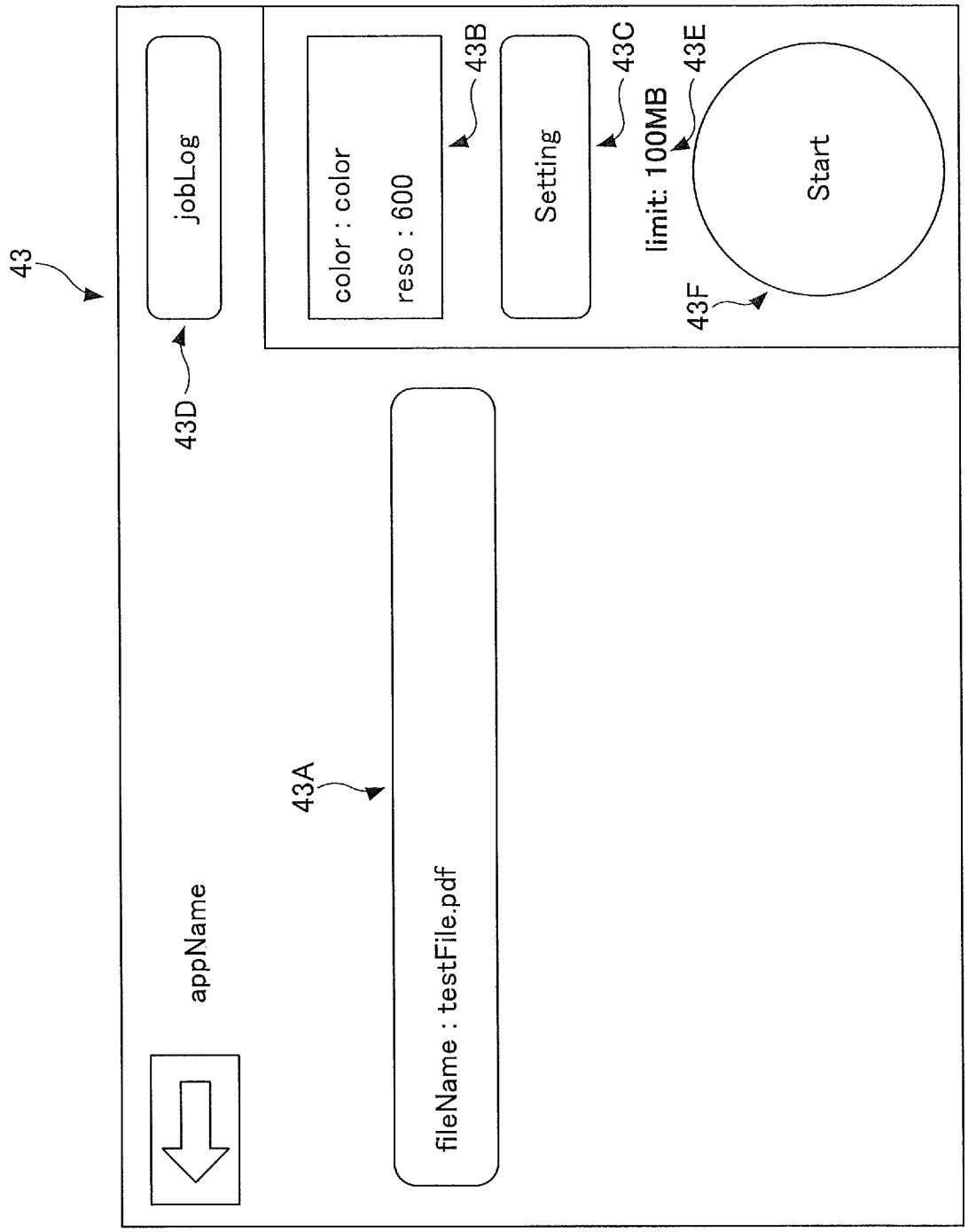
FIG. 14 is a diagram illustrating an example of an application screen, according to the exemplary embodiment.

FIG. 14 is a diagram illustrating an example of the application screen 43, according to the present embodiment. The application screen 43 is a screen for selecting and executing the workflow F generated by the process described with reference to FIG. 7, for example. In the example of the application screen 43 illustrated in FIG. 14, a workflow designation area 43A for inputting a title or a file name based on the information illustrated in FIG. 9 is arranged. On the right side of the application screen 43, a current scan setting value 43B, a setting button 43C for transitioning to the scan setting screen 44 (see FIG. 16), a button 43D for displaying the execution history screen 42, an input upper limit 43E, and a start button 43F for executing a job are displayed.

The input upper limit 43E displayed on the application screen 43 is the file maximum value (file maximum limit), which is an upper limit of file size of the workflow F to be started. The input upper limit 43E is obtained by the maximum value calculation unit (the flow save unit 94 of the metadata generation service 9). By displaying the information on an upper limit (upper limit value) on the screen at a time of starting a workflow, a user is surely notified of the file maximum limit (file maximum value) of the workflow to be started by the user.

When each of all components included in a flow is not set with a file maximum value, which indicates a file size processable by a corresponding component, a file maximum value (file maximum limit) of the flow may not be set. In this case, the application screen 43 may be set not to display information of the input upper limit 43E.

Figure 15:
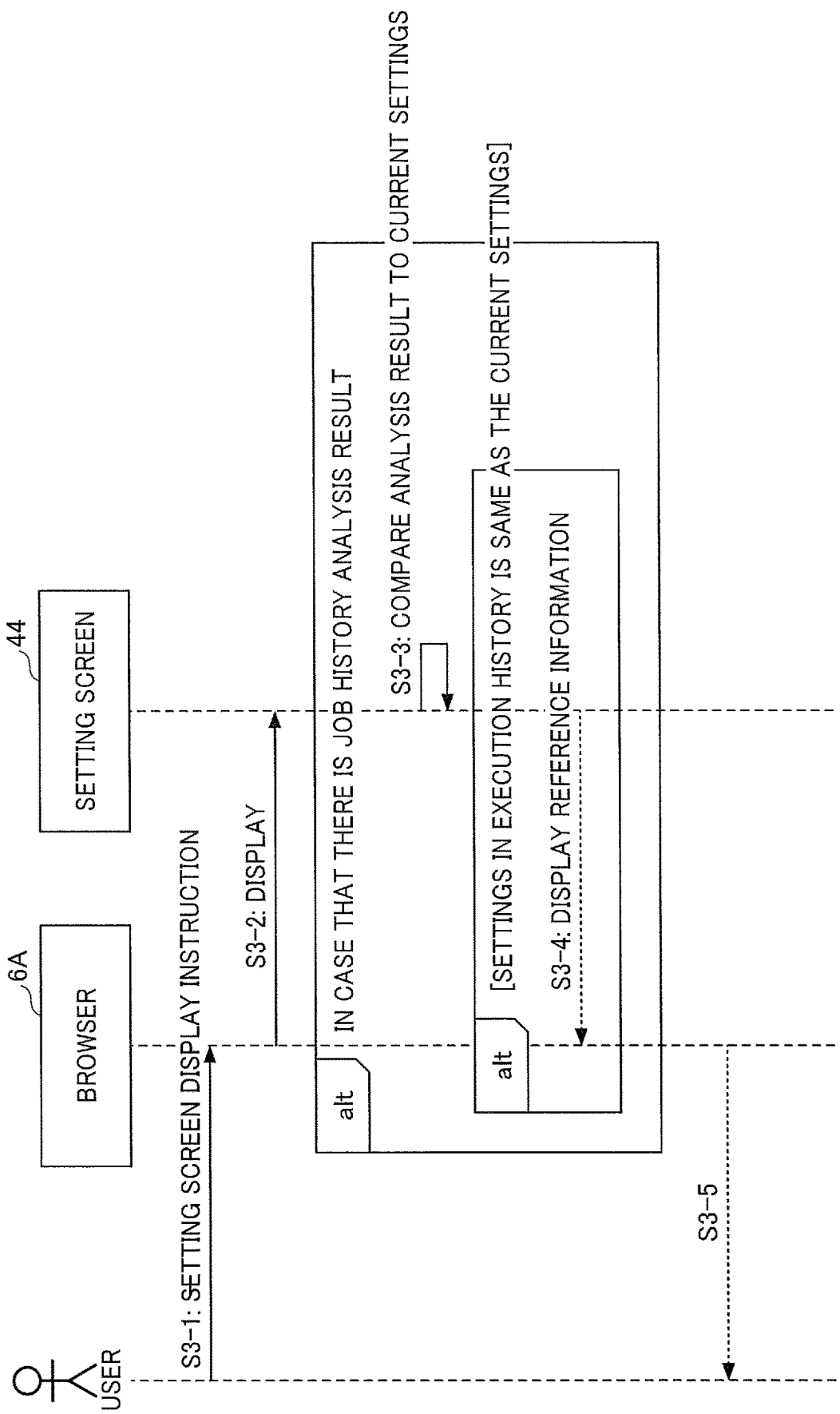
FIG. 15 is a sequence diagram illustrating an example of a setting screen display process, according to the exemplary embodiment.

Setting Screen Display Process:

A process of displaying a setting screen is described with reference to FIG. 15 to FIG. 17. FIG. 15 is a sequence diagram illustrating an example of a process of displaying a setting screen (setting screen display process) according to the present embodiment. The process of FIG. 15 is executed when the setting button 43C for transitioning to the scan setting screen 44 (see FIG. 16) is pressed on the application screen 43 illustrated in FIG. 4, for example.

The user inputs a display instruction to display the scan setting screen 44 by pressing the setting button 43C on the application screen 43 (step S3-1). In response to the display instruction, the browser 6A starts processing for displaying the scan setting screen 44 (step S3-2).

At this time, when there is an analysis result of the job history analysis process illustrated in FIG. 12, the analysis result is compared to current settings (step S3-3). When the analysis result, that is, the execution history in which the file size error occurred, is substantially the same as the current settings, reference information for avoiding occurrence of an error related to a file size (file size error) is displayed on the scan setting screen 44 (step S3-4), and the scan setting screen 44 including the reference information is presented to the user (step S3-5).

Figure 16:
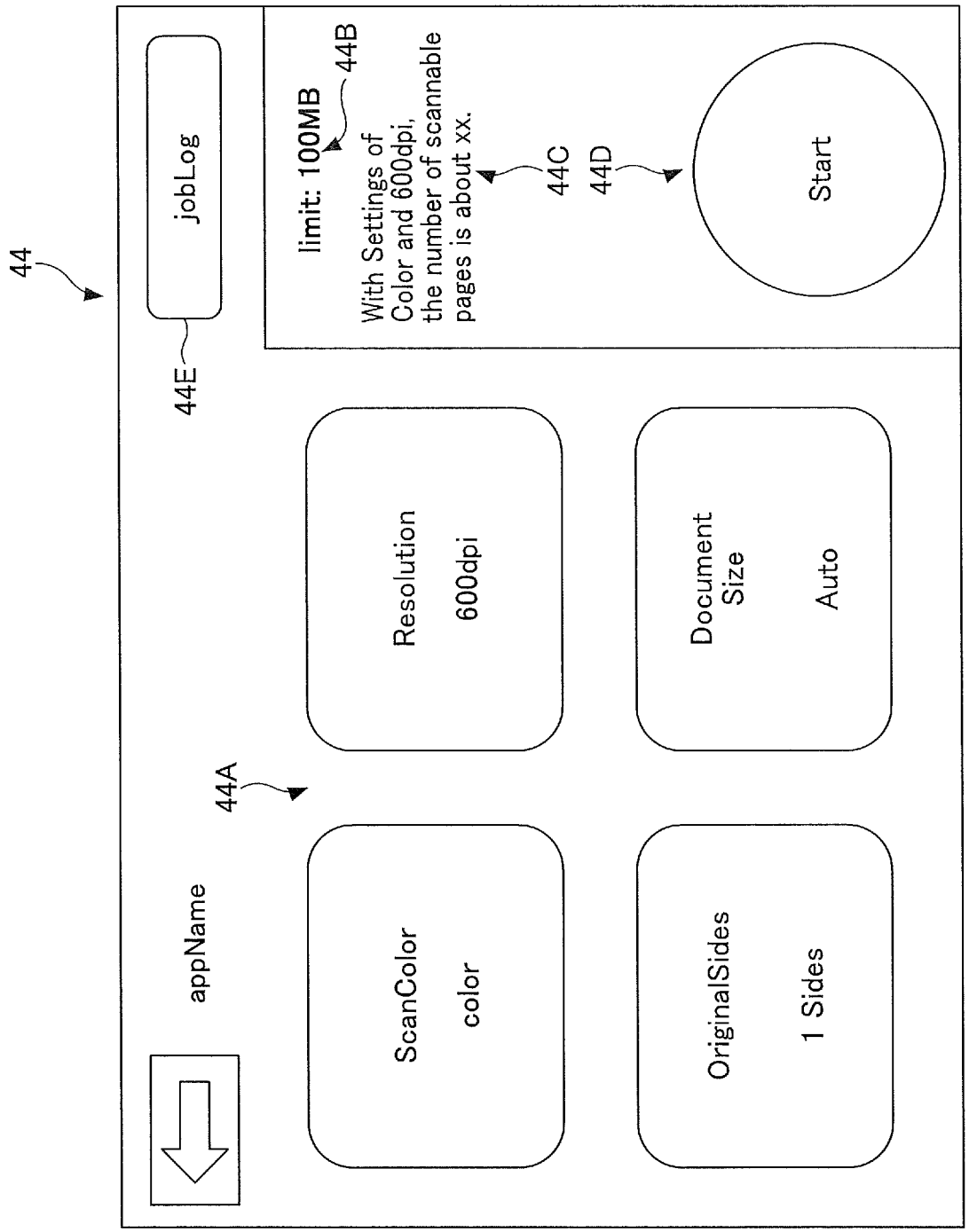
FIG. 16 is a diagram illustrating an example of a scan setting screen, according to the exemplary embodiment.

FIG. 16 is a diagram illustrating an example of the scan setting screen 44, according to the present embodiment. A button 44A for each of a plurality of setting parameters is arranged at the center of the scan setting screen 44, and the setting value of each setting parameter is changeable. On the right side of the scan setting screen 44, similarly to the application screen 43 of FIG. 14, a button 44E for displaying the execution history screen 42, an input upper limit 44B, and a start button 44D for executing a job are displayed.

When the processing of steps S3-3 and S3-4 in FIG. 15 is performed, reference information 44C is also displayed on the scan setting screen 44. In the example of FIG. 16, information on the number of scannable sheets in a case of the current settings is displayed as reference information. When the flow execution upper limit is low, recommended settings (information on recommended settings) may be displayed to reduce a size of a scan result. The recommended settings may include changing color setting to monochrome or decrease the resolution in scanning.

The reference information is generated based on the execution history. The reason for this is that, in the case of scan, a size per page varies depending on, for example, the number of characters or a color scheme of a document to be read, and the number of scanned sheets (the number of scans) is not simply usable for the comparison. In addition, because a size may increase in the middle of processing depending on how the flow is arranged, comparing to the history improve the accuracy.

In addition, the execution history used for generating the reference information is not limited to the job history associated with the file size error, and may be the job history associated with successful scan processing without an error occurring. In this case, a case in which the same settings as the current settings succeeds may be presented to the user as the reference information.

In the example of FIG. 16, the reference information 44C displayed on the scan setting screen 44 may also be referred to as information on a recommended settings with which the file size error may be avoided, based on the execution history. The user may fail to specifically determine how to avoid the occurrence of the file size error in the case that merely the file maximum limit of the workflow F is presented. Even in such a case, by presenting the information on the recommended settings to the user, the user who uses the recommended settings more likely to avoid the occurrence of the file size error.

Figure 17:
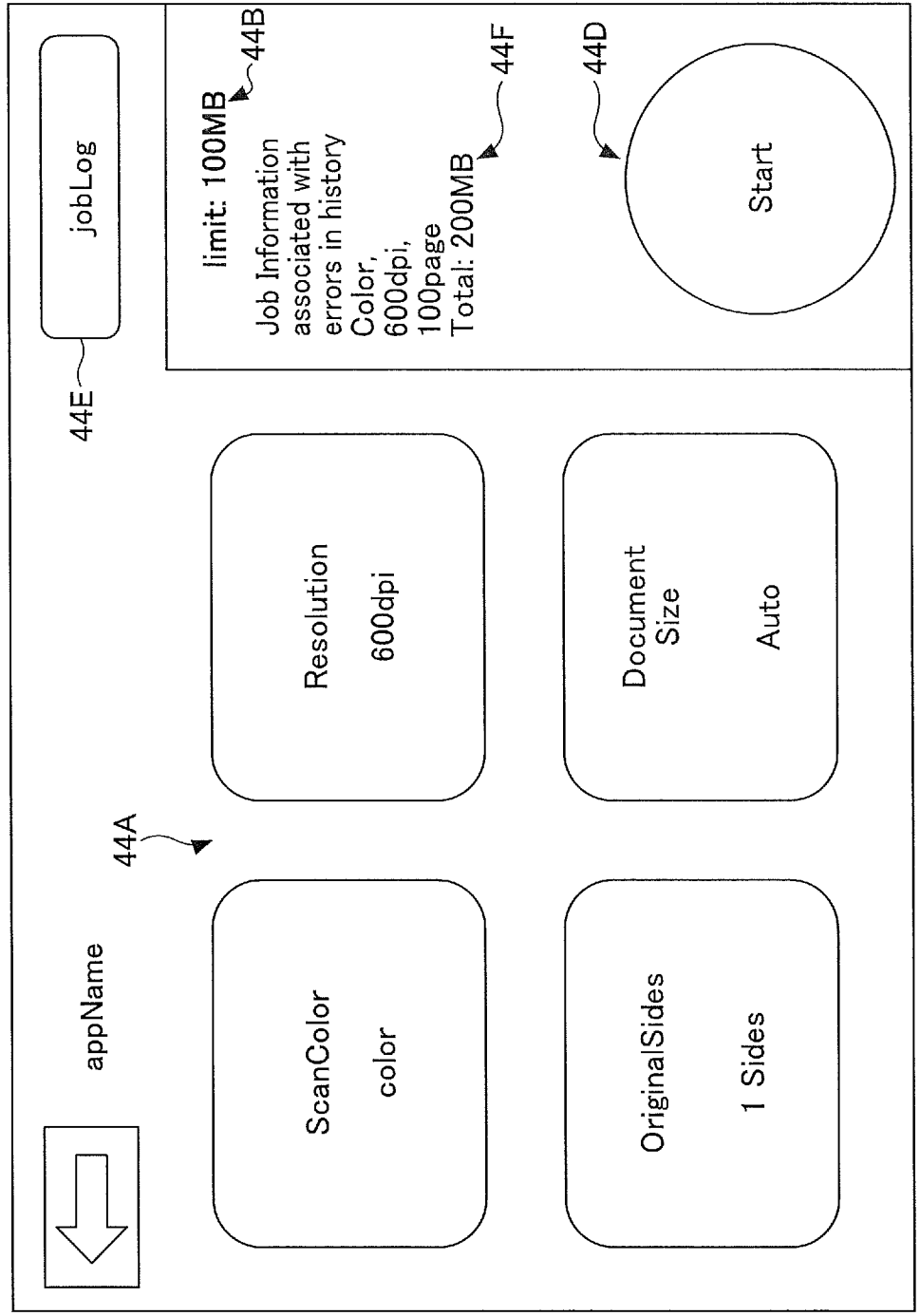
FIG. 17 is a diagram illustrating another example of the scan setting screen, according to the exemplary embodiment.

FIG. 17 is a diagram illustrating another example of the scan setting screen 44, according to the present embodiment. The example of screen illustrated in FIG. 17 is different from the example of screen illustrated in FIG. 16 in content of the reference information 44F.

In the example of FIG. 16, the information on the recommended settings corresponding to such as the number of scannable sheets is displayed as the reference information 44C based on the job history associated with the file size error. In the example of FIG. 17, the information on the job history of the file size error is displayed as the reference information 44F. With this configuration, in a case of referring to the history, for example, a method of preferentially referring to records of the history from one having settings in which the number of the same setting values with that of the current settings is high to another one having settings in which the number of the same setting values with that of the current settings is less may be used. In addition, in using such a method, when there are two or more records of which the number of the same setting values with that of the current settings are the same with each other, the latest error record may be used to be referred.

In the example of FIG. 17, the reference information 44F displayed on the scan setting screen 44 may also be referred to as information on settings based on the execution history corresponding to the setting content with which the prior file size error occurred. The user may fail to specifically determine how to avoid the occurrence of the file size error in the case that merely the file maximum limit of the workflow F is presented. Even in such a case, by presenting the information on the settings related to the prior error to the user, the user who uses settings different from the settings related to the prior error more likely to avoid the occurrence of the file size error.

The reference information displayed on the scan setting screen 44 is not limited to the reference information 44C in FIG. 16 and the reference information 44F in FIG. 17 as long as the reference information is usable for avoiding occurrence of an error related to a file size (file size error). For example, the reference information may include a warning message notifying the user that there is a high probability of occurrence of an error related to the file size (file size error). With this, the user is more surely to be notified that there is a high probability of occurrence of a file size error.

Figure 18:
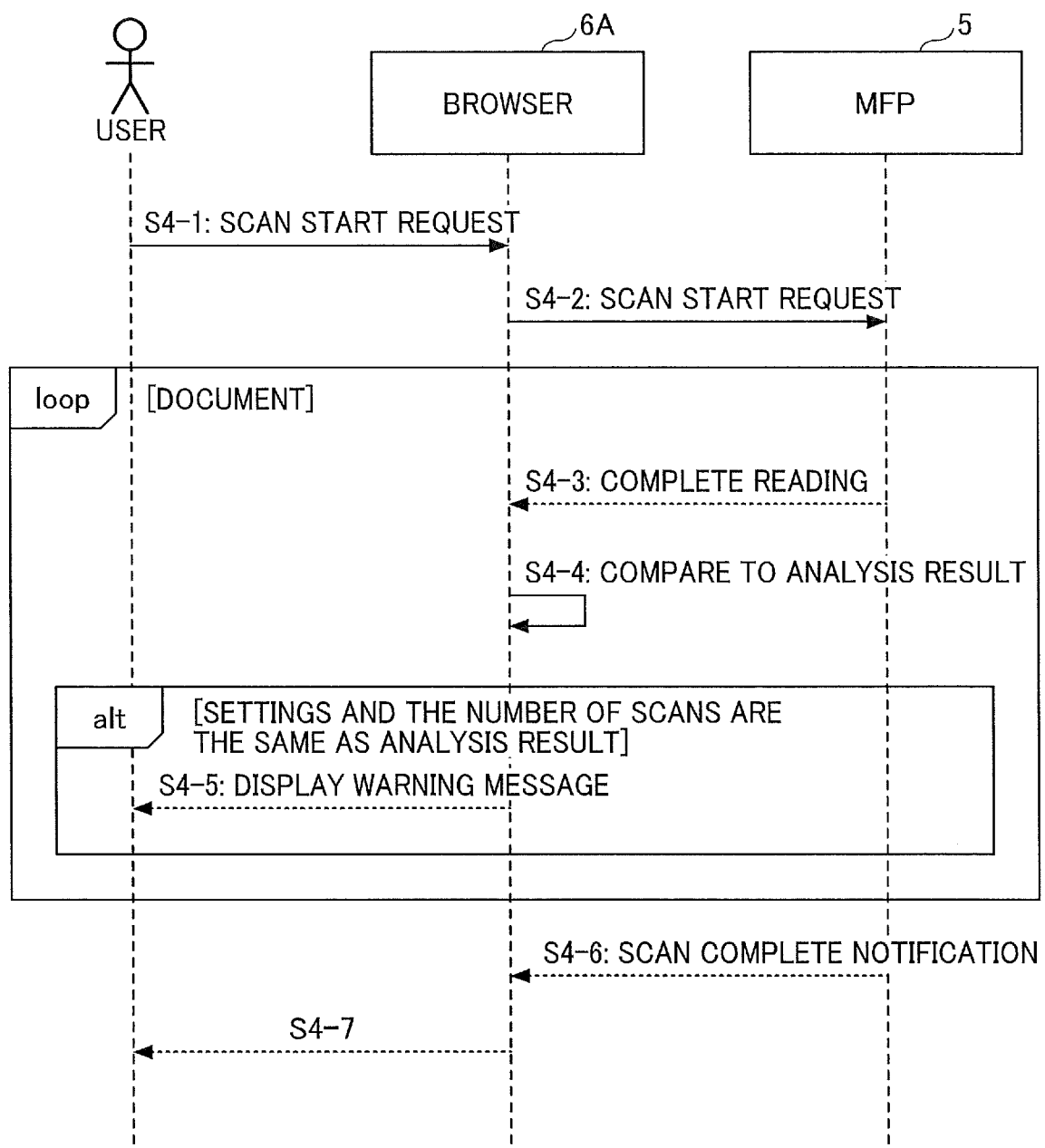
FIG. 18 is a sequence diagram illustrating an example of a process performed in scanning according to the exemplary embodiment.
Figure 19:
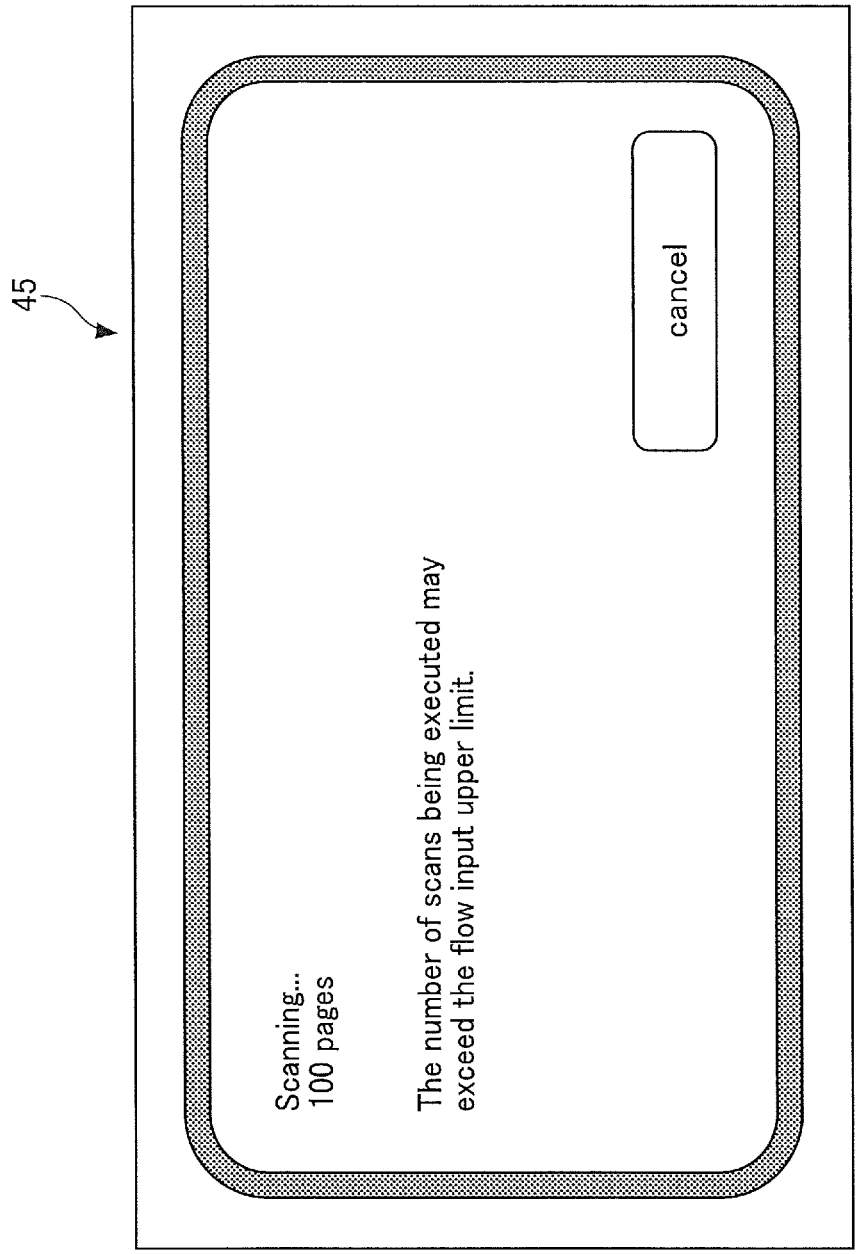
FIG. 19 is a diagram illustrating an example of a warning message screen in scanning, according to the exemplary embodiment.

Warning Display Process:

A process of displaying a warning in executing a workflow is described with reference to FIG. 18 and FIG. 19. FIG. 18 is a sequence diagram illustrating an example of a process performed in scanning according to the present embodiment. FIG. 19 is a diagram illustrating an example of a warning message screen 45 in scanning, according to the present embodiment.

When the user selects a start button on the browser 6A, a scan start request is transmitted to the MFP 5 (steps S4-1 and S4-2). The MFP 5 transmits a document reading completion notification to the browser 6A every time one document is scanned (step S4-3). After receiving the notification, if there is an analysis result obtained in the job history analysis process illustrated in FIG. 12, the browser 6A compares the settings in the analysis result with the current settings. When there is the same parameter in the comparison, the current settings and the analysis result are further compared with each other in the number of read sheets (step S4-4). When these parameters coincide with each other, there is a high probability of occurrence of a file size error, so that the warning message screen 45 as illustrated in FIG. 19 is displayed to the user (step S4-5).

When there is no analysis result obtained in the job history analysis process illustrated in FIG. 12 or when the user does not perform any cancel operation on the warning message screen 45 (for example, when a predetermined period of time has passed without any cancel operation performed by the user), the MFP 5 notifies the user of the completion of scan via the browser 6A when the scan processing is completed (steps S4-6 and S4-7).

In the comparison processing in step S4-4, for example, when there is a record of the history in which the parameters completely match with that of the current settings, the record of the history is referred to, and when there is no record of the history in which the parameters completely match with that of the current settings, records having many partially matching parameters are referred to. In the example illustrated in FIG. 18, the message is displayed in a case where the number of sheets exceeds the number of sheets in the history during the execution of the scan with the same settings. Alternatively, after all the documents are read, the user may be inquired whether to execute the flow by comparing with the analysis result before executing the flow.

The present embodiment is described above with reference to specific examples. However, the present disclosure is not limited to these specific examples. Those obtained by those skilled in the art who make appropriate design changes to these specific examples are also included in the scope of the present disclosure as long as the modified examples have the features of the present disclosure. The elements provided in each of the specific examples described above and the arrangement, conditions, shapes, and the like of the elements are not limited to those illustrated but can be changed as appropriate. The respective elements included in the above-described specific examples can be appropriately combined as long as there is no technical contradiction.

In a conventional technique, the upper limit value of usage amount is managed for each function included in the workflow. However, the usage amounts are not compared between the plurality of functions, and this means that an upper limit of acceptable file size of the workflow as a whole is not managed. That is, a user who actually operates no way to check the upper limit of the file size (file capacity).

According to an embodiment of the disclosure, an upper limit of file size processable by a workflow is managed and is notified to a user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing system, comprising circuitry configured to:
generate a workflow as a current workflow;
analyze the current workflow to obtain a file maximum value indicating a maximum value of a file size processable by the current workflow;
cause a display to display the file maximum value obtained; and
in response to a workflow execution request, refer to setting content of the current workflow and execution history, and cause the display to display reference information to be referred to, to avoid a file size error, the file size error being an error related to a file size.

2. The information processing system of claim 1, wherein, in case that the execution history includes a prior file size error occurred under a condition of the setting content same as the current workflow, the circuitry causes the display to display, based on the execution history, the reference information including information on settings corresponding to the setting content with which the prior file size error occurred.

3. The information processing system of claim 1, wherein, in case that the execution history includes a prior file size error occurred under a condition of the setting content same as the current workflow, the circuitry causes the display to display, based on the execution history, the reference information including information on recommended settings to avoid the file size error.

4. The information processing system of claim 1, wherein, the reference information includes a warning message to notify a user that there is a probability of occurrence of the file size error in executing the current workflow set with the setting content.

5. The information processing system of claim 1, wherein the circuitry further notifies a user of a warning on a probability of a file size error immediately before a value of the file size of the current workflow being executed exceeds the file maximum value.

6. An information processing method, comprising:
generating a workflow;
analyzing the workflow to obtain a file maximum value indicating a maximum value of a file size processable by the workflow;
causing a display to display the maximum value; and
in response to a workflow execution request, referring to setting content of the current workflow and execution history, and causing the display to display reference information to be referred to, to avoid a file size error, the file size error being an error related to a file size.

7. A non-transitory recording medium storing a plurality of instructions which, when executed by one or more processors, causes the processors to perform a method, the method comprising:

generating a workflow;
analyzing the workflow to obtain a file maximum value indicating a maximum value of a file size processable by the workflow;
causing a display to display the maximum value; and
in response to a workflow execution request, referring to setting content of the current workflow and execution history, and causing the display to display reference information to be referred to, to avoid a file size error, the file size error being an error related to a file size.

* * * * *